United States Patent [19]

Hnatko

[11] 4,311,242

[45] Jan. 19, 1982

[54] BEARING CARTRIDGE SUPPORTS FOR ROLL SCREENS AND THE LIKE

[75] Inventor: Karl J. Hnatko, Hibbing, Minn.

[73] Assignee: Taconite Engineering & Manufacturing Co., Hibbing, Minn.

[21] Appl. No.: 229,343

[22] Filed: Jan. 29, 1981

[51] Int. Cl.$^3$ .............................................. B07B 1/14
[52] U.S. Cl. ................................... 209/668; 198/790; 209/673; 308/189 R
[58] Field of Search ....................... 209/668, 673, 393; 198/789–791; 308/20, 30, 31, 189 R

[56] References Cited

U.S. PATENT DOCUMENTS

| | | | |
|---|---|---|---|
| 1,989,988 | 2/1935 | Jones | 308/20 X |
| 2,365,822 | 12/1944 | Jones | 209/668 |
| 2,973,093 | 2/1961 | Erickson | 198/789 X |
| 2,988,781 | 6/1961 | Meyer | 264/117 |
| 3,848,741 | 11/1974 | Haley et al. | 209/668 |
| 3,848,744 | 11/1974 | Flaherty | 209/393 |

*Primary Examiner*—Ralph J. Hill
*Attorney, Agent, or Firm*—Burd, Bartz & Gutenkauf

[57] ABSTRACT

A bearing cartridge support for roll apparatus, such as roll screens, feeders, conveyors, and the like, having a frame and a plurality of parallel horizontally extending rolls journaled for driven rotation. The bearing supports include a vertical support carrying a bearing cartridge in the form of a hollow cylindrical housing having a pair of spaced apart bearings therein. Each support plate has lap tongues along its opposite vertical edges and vertically spaced apart fastening means engageable in longitudinal channels in the frame. The ship lapping facilitates maintenance of a seal while permitting variation in spacing between adjacent bearing cartridges. A short roll-supporting stub shaft is journaled for rotation in each bearing, these shafts being engageable by the ends of rolls to be supported within the frame. The stub shafts on one side of the apparatus are adapted to be driven within a closed case protected against entry of abrasive foreign materials. The use of stub shafts permits the easy removal and replacement of worn rolls. The rolls are driven by a drive chain held against roll sprockets by adjustable support bars on the lower side.

14 Claims, 12 Drawing Figures

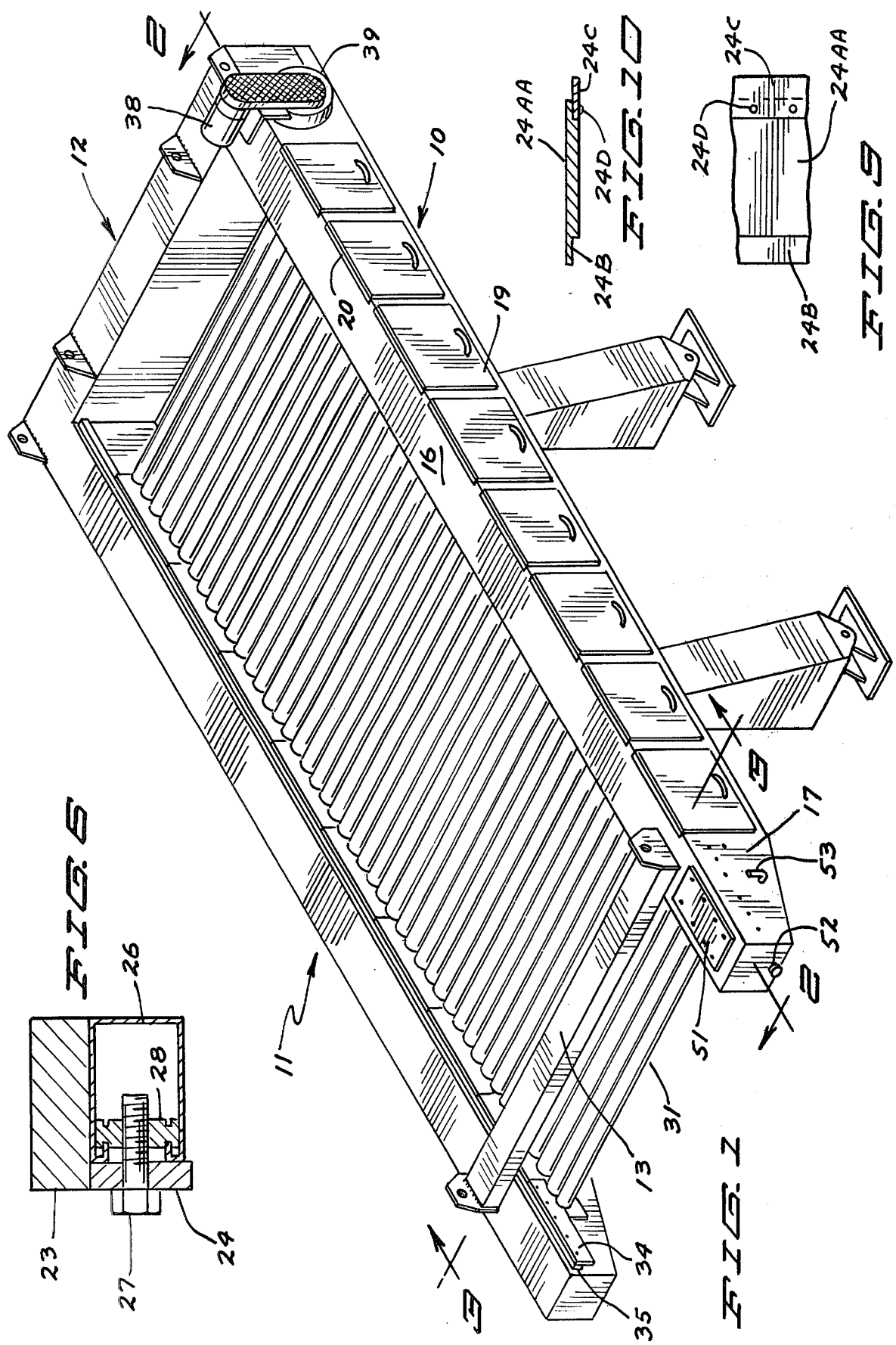

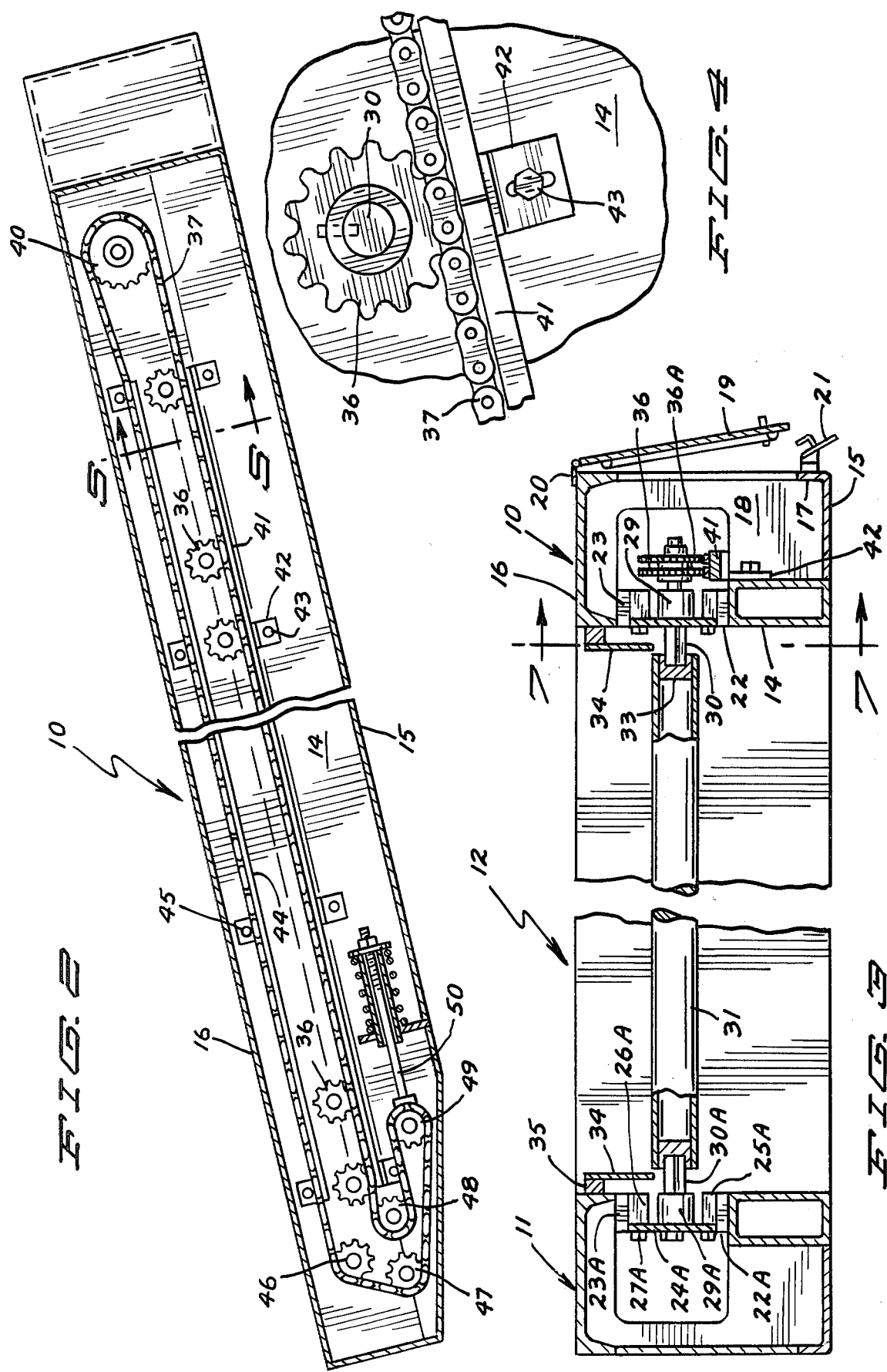

BEARING CARTRIDGE SUPPORTS FOR ROLL SCREENS AND THE LIKE

FIELD OF THE INVENTION

1. Background of the Invention

This invention relates to bearing cartridges for supporting parallel horizontal rollers in apparatus such as roll screens, feeders, conveyors, and the like, used in dirty environments. Roll screens such as are commonly used for sizing taconite pellets are subject to abrasive wear. Taconite dust entering the drive chain case of such apparatus subjects the drive mechanism to excessive abrasive wear. The necessity of entrance into the chain case in order to change worn rolls introduces undesirable dust into the case. Similar problems occur in the handling of other dust-producing materials such as sand, gravel, etc. The present invention is directed to improved structure alleviating these problems.

2. The Prior Art

A typical roll screen is shown in Meyer U.S. Pat. No. 2,988,781. The roll screen of this patent is comprised of a deck having a plurality of cylindrical parallel spaced apart rolls, each being rotatable about its own longitudinal axis. Undersized pellets from a balling drum drop through the spaces between adjacent rolls; proper sized pellets are conveyed by the rotation of the rolls to a discharge point and oversize pellets discharge off the end of the screen.

Flaherty U.S. Pat. No. 3,848,744 shows a similar roll screen whose rolls have an outer shell of hard chromium or the like intended to reduce abrasion of the screen rolls and extend their useful service life.

Haley et al U.S. Pat. No. 3,848,741 shows a roll screen in which the rolls are adjustable for changing the sizing of the roll screen and for compensating for wear of the rolls. The rolls are driven from the bottom in order to facilitate replacement of individual rolls and the rolls are mounted in bearings protected from dust by means of a protective wall made up of overlapping plates or shields.

SUMMARY OF THE INVENTION

The present invention represents an improvement over the roll screens of the past, and similar apparatus including parallel spaced apart horizontal rolls. The rolls are supported in bearing cartridges within a sealed drive chain case. The individual rolls engage stub shafts of the bearing cartridges which support and drive the rolls. These rolls, which are subject to abrasive wear, have integral sockets to accept the stub shafts. This arrangement allows the rolls to be changed in the field without entrance into the chain case, protecting the chain case from entry of abrasive dust. The rolls are individually driven through a rack and pinion arrangement by which the chain is held against the roll sprockets by adjustable support bars on the lower (tension) side. Spacing between rolls is adjustable, the chain case sealing being accomplished by ship-lapping the bearing cartridge supports.

BRIEF DESCRIPTION OF THE DRAWINGS

The invention is illustrated in the accompanying drawings in which corresponding parts are identified by the same numerals and in which:

FIG. 1 is an isometric view of a roll screen according to the present invention;

FIG. 2 is a longitudinal section on the line 2—2 of FIG. 1 and in the direction of the arrows;

FIG. 3 is a transverse, partly schematic, section on the line 3—3 of FIG. 1 and in the direction of the arrows;

FIG. 4 is a fragmentary elevation on an enlarged scale showing the means for adjustment of the support bar for the drive chain engaging screen roll sprockets;

FIG. 5 is a fragmentary transverse section on an enlarged scale showing details of the bearing cartridge support and drive and mounting of screen rolls taken on the line 5—5 of FIG. 2 and in the direction of the arrows;

FIG. 9 is a fragmentary elevation showing an alternative form of bearing support plate;

FIG. 10 is a horizontal section through the plate of FIG. 9;

DETAILED DESCRIPTION OF THE PREFERRED EMBODIMENT

Figure 6:
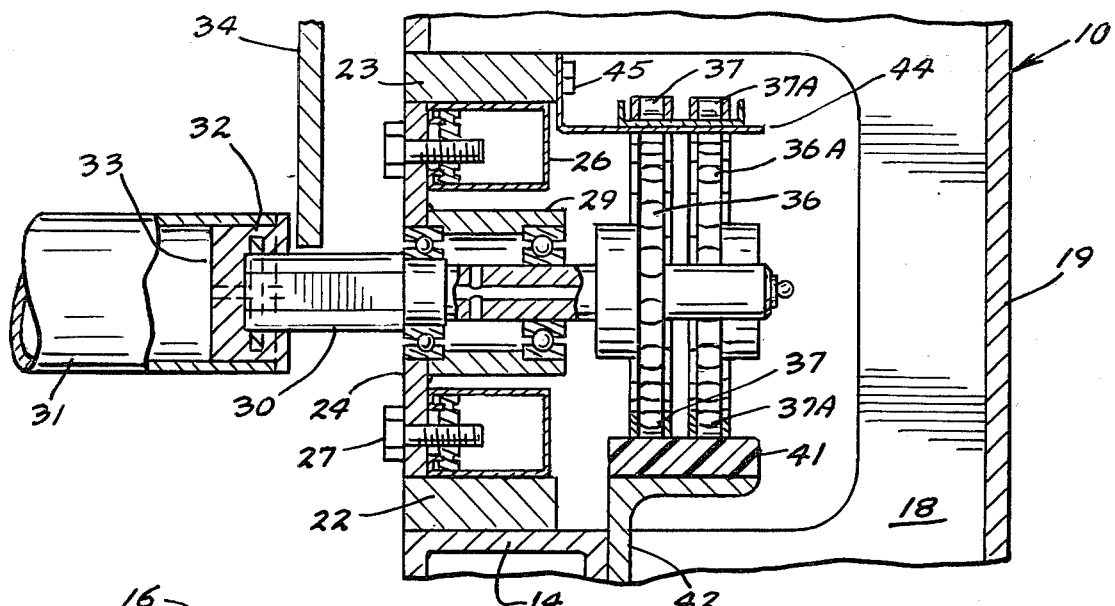
FIG. 6 is a fragmentary transverse section on a further enlarged scale showing the method for adjustably mounting bearing support plates.

Referring now to the drawings, the roll screen includes a generally rectangular frame having a longitudinal side member 10, which functions as a drive chain case, a parallel spaced apart longitudinal member 11, which functions as a case for idler bearings, and transverse end members 12 and 13. As best seen in FIG. 3. the drive chain case 10 includes a longitudinal tubular channel or support beam 14, a bottom wall plate 15, an inverted C-channel member 16 forming a top plate, and an apertured outside wall 17, all welded or otherwise secured together into a rigid housing. A plurality of longitudinally spaced apart transverse vertical partitions 18 impart further strength and rigidity to the housing. A door 19 hinged at 20 to top plate 16 covers each opening or access port in wall 17. A suitable clamp 21 engages each door to seal the entry ports. Idler case 11 is similarly constructed in mirror image, except that the access ports may be left open. As best seen in FIG. 2, the entire frame is supported so that the roll bed is at an inclined angle (e.g. about 14° at one installation).

As best seen in FIG. 5, a pair of longitudinally extending parallel vertically spaced apart bars 22 and 23 are welded, respectively, to tubular channel 14 and top channel 16 of the chain case. A plurality of bearing cartridge supports are mounted between bars 22 and 23. Each bearing cartridge support includes a support plate 24 adapted to be positioned between bars 22 and 23. A Unistrut channel 25 (Unistrut Corporation, Wayne, Michigan) is welded or otherwise secured to bar 22. A similar Unistrut channel 26 is welded or otherwise secured to the bottom surface of bar 23. Both channels are set inwardly from the edges of the bars by about the thickness of support plate 24. The support plate is secured to the chain case by bolt 27 engaging Unistrut nut 28 having slots which engage in-turned flanges of channels 25 and 26 (FIG. 6).

A bearing cartridge 29 comprised of a pair of spaced apart ball bearings in a tubular housing is supported from plate 24. A stub shaft 30 is journaled for rotation within each bearing cartridge. One end of shaft 30 is splined or is square, hexagonal or other torque transmitting cross section adapted to engage a recess or socket in the end of roll 31. Preferably, stub shaft 30 engages a recessed socket in a hub disc insert 32 embedded and pinned in an elastomeric roll hub 33 to cushion possible deflections of the rolls so as to prevent transmission to and possible damage to the bearings. Hub 33 may be formed, for example, from polyurethane (Irathane compound 3040).

The idler bearing cartridges, stub shaft and bearing support are of generally similar structure and are mounted in generally the same manner, with one notable exception. Idler stub shaft 30A protrudes from bearing cartridge 29A on the side opposite from support plate 24A (FIG. 3). Because of this, the Unistrut channels 25A and 26A are secured to bars 22A and 23A with their open flanged edges facing away from the roll deck. Thus, bearing support plate 24A is secured to the frame by engagement of the Unistrut nuts and bolts 27A with the Unistrut channels on the side away from the roll bed. This permits easy removal and replacement of worn rolls from the idler side of the apparatus, without entry into the chain case. Bolts 27A securing plate 24A need merely be loosened to the extent necessary to disengage the end of stub shaft 30A from the idler end of the roll. This then permits easy disengagement of the driven end of the roll from corresponding stub shaft 30.

Figure 7:
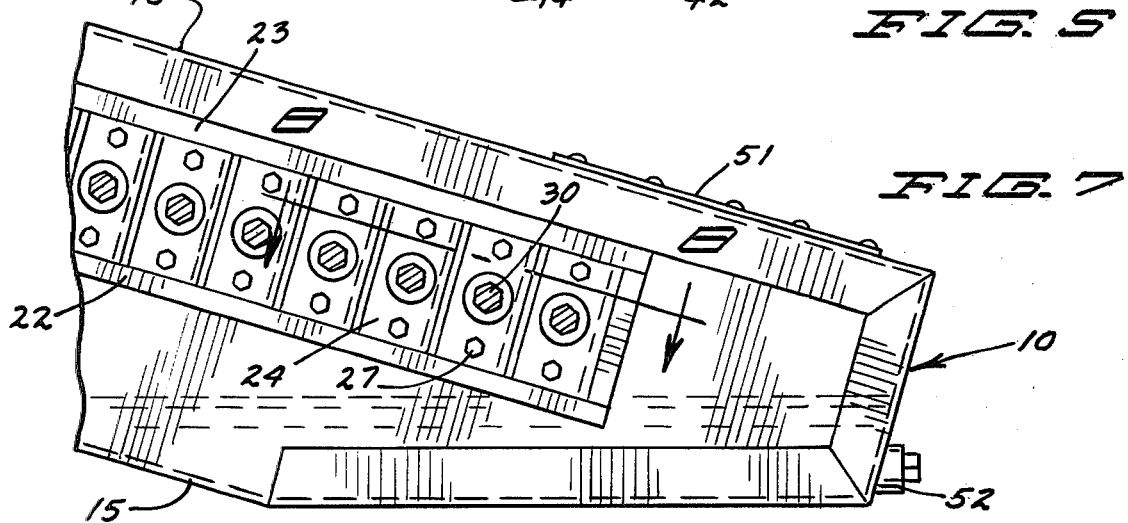
FIG. 7 is a partial elevation generally along the line 7—7 of FIG. 3 and in the direction of the arrows.
Figure 8:
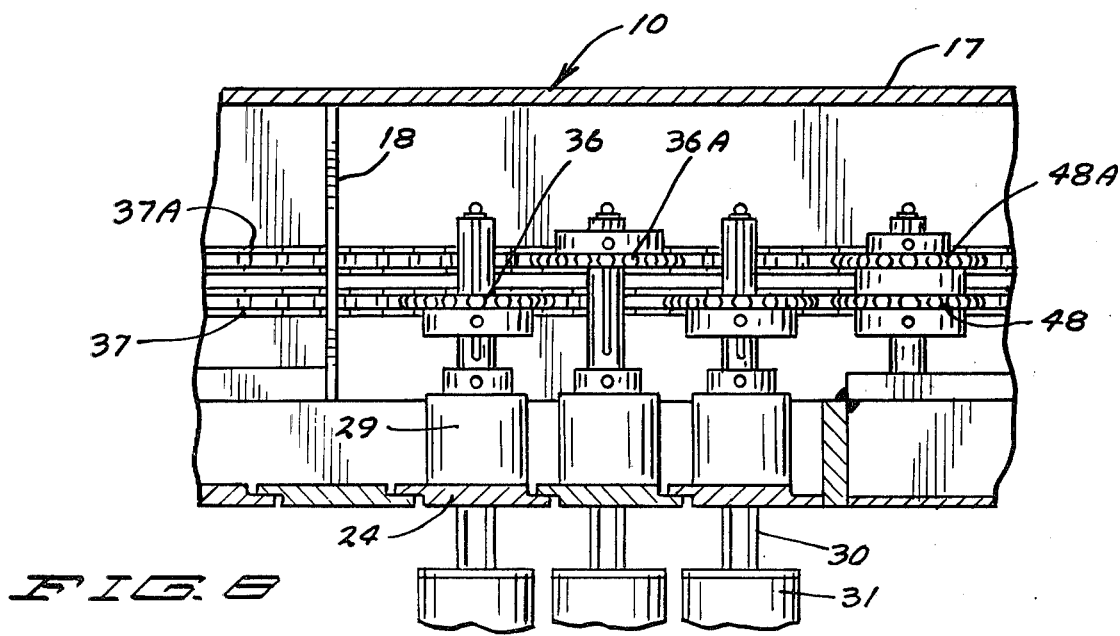
FIG. 8 is a fragmentary plan view, partly in section, on the line 8—8 of FIG. 7.

As best seen in FIG. 7, the bearing support plates 24 are provided with half-lap seal tongues along their opposite vertical edges to permit the ship-lapping of the plates in order to maintain a seal as the positions of the bearing cartridges and support plates are varied to accommodate rolls of different diameters, to vary the spacing between rolls, and the like. Where the rolls are widely spaced apart, blank lapped plates may be installed between bearing support plates.

An alternative form of bearing support plate 24AA is shown in FIGS. 9 and 10. This form of support plate is especially adapted to expedite the removal of a single roll assembly for repair or replacement. The plate 24AA is provided with a conventional half-lap tongue 24B along one vertical edge. It is provided with another half-lap tongue along its opposite vertical edge in the form of a removable vertical seal plate 24C recessed in the front face of plate 24AA. Seal plate 24C extends beyond the edge of the support plate and is secured thereto by screws 24D or similar fasteners. These alternative support plates 24AA permit ship-lapping of the plates in the same manner already described. However, when the diameter and spacing of the rolls is such that the overlapping support plates are closely spaced together, with little room for lateral adjustment, then removal of a single bearing cartridge is facilitated by removal of the seal plate 24C.

Figure 12:
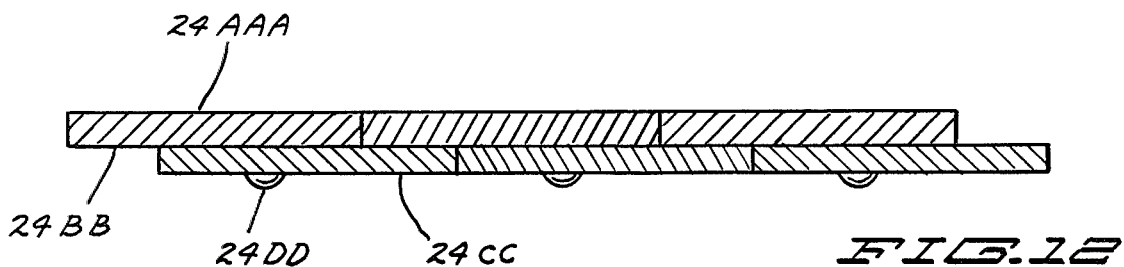
FIG. 12 is a horizontal section through the plates of FIG. 11.
Figure 11:
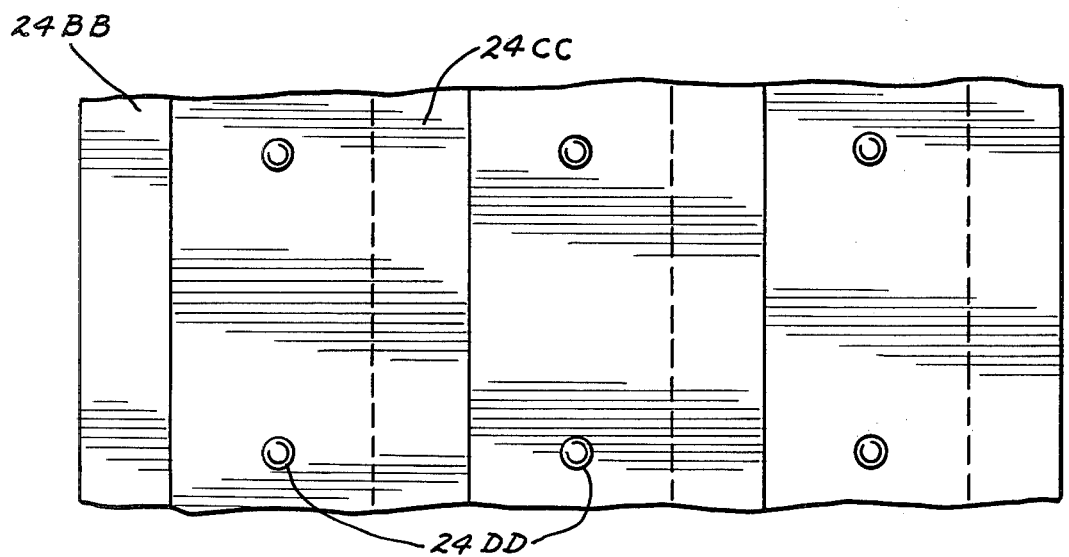
FIG. 11 is a fragmentary elevation showing a further alternative form of bearing support plate.

A further alternative form of bearing plate 24AAA is shown in FIGS. 11 and 12. This form of support plate is also especially adapted to expedite the removal of a single roll assembly for repair or replacement. The plate 24AAA is provided with a half-lap tongue along one vertical edge in the form of a removable vertical seal plate 24CC of the same width as plate 24AAA but displaced to form a half-lap tongue 24BB along one vertical edge. The extending overlap of seal plate 24CC along the opposite vertical edge forms another half-lap tongue engageable to form a half-lap joint between two adjacent bearing support plates. The removable vertical seal plates 24CC are in face-to-face abutment with plates 24AAA and are secured thereto by screws 24DD or similar fasteners. These alternative support plates also permit ship-lapping of the plates in the manner already described. Removal of a single bearing cartridge is facilitated by removal of the confining seal plates 24CC. The back surfaces of the seal plates are desirably provided with a coating of neoprene or similar rubber or rubber-like material to produce a good seal.

A plurality of longitudinally arrayed skirt panels 34 are mounted on the inside top edges of the drive chain and idler cases 10 and 11, respectively. The skirting panels are spaced from the case walls so as to be closely spaced with moving clearance from the ends of rolls 31 to retain the material on the roll deck. This spacing is accomplished by means of a mounting bar or channel 35. Preferably, a Unistrut channel is used for this purpose. The skirt extends downwardly below the top surface of the roll deck, being spaced from the stub shafts only sufficiently far to permit moving clearance so as to provide maximum protection for the bearings. The skirt panels are formed from material which is abrasion-resistant, preferably a synthetic resinous material such as ultra-high molecular weight polyethylene or hard chrome-plated steel. The skirt panels are mounted for easy removal and replacement.

Each stub shaft 30 is provided with a drive sprocket 36. Where necessary to accommodate larger diameter sprockets, the sprockets 36A on alternate shafts are displaced laterally. The sprockets are driven by roller chains 37 and 37A, which can be a double strand chain. The chain is driven by a motor 38 through an appropriate gear reducer 39 and driven sprocket 40. The chain engages the lower periphery of each shaft sprocket 36. The lower (tension) side of the chain is held against the roll sprockets by support bars 41 which are supported by slotted brackets 42 secured by bolts 43 to frame channel members 14. The upper (non-tension) flight of chain 37 is supported by a bar 44 spaced above the roll sprockets and secured by bolt 45 to frame bar 23, with only the chain rollers contacting the support bar. In its travel path, chain 37 engages idler sprockets 46–49, the last of which is mounted in a spring-loaded takeup bracket 50 to maintain proper tension on the chain. Where alternate drive sprockets 36A are employed, the chain drive as described is duplicated. All rolls are rotated in the same direction.

An inspection and service cover 51 is provided in the top wall 16 of the chain case at its lowermost downstream end. Lubricating oil is introduced through this service port to maintain an oil bath through which drive chain 37 passes to lubricate the drive mechanism. An oil drain 52 is provided, along with an oil level sight gauge 53. The bearings are packed with lubricating grease either through individual fittings for each bearing cartridge, or preferably from remote lubrication fittings accessible from the outside of the chain case.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A bearing cartridge support for roll apparatus which comprises:
   (A) a vertical bearing support plate, said plate having:
      (1) lap tongues along its opposite vertical edges, and
      (2) vertically spaced apart fastening means,
   (B) a bearing cartridge supported by said plate and extending perpendicular thereto, said cartridge including:
      (1) a hollow housing, and
      (2) a pair of spaced apart bearings within the housing, and
   (C) a short roll-supporting stub shaft journaled for rotation in said bearings, one end of said shaft being torgue transmitting in cross section and engageable by one end of a roll to be supported and rotated thereby.

2. A bearing cartridge support according to claim 1 wherein the opposite end of said shaft is fitted with drive means.

3. A bearing cartridge support according to claim 2 wherein said drive means is a drive sprocket.

4. A bearing cartridge support according to claim 1 wherein said bearings are ball bearings.

5. A bearing cartridge support according to claim 1 wherein the lap tongue along one vertical edge of the vertical support plate is a vertical seal plate removably secured to the support plate in face-to-face abutment and extending beyond the support plate along one edge.

6. A roll apparatus having a frame and a plurality of parallel horizontally extending rolls journaled for rotation therein, said apparatus characterized by:
   (A) a plurality of pairs of bearing cartridge supports for supporting and rotating a plurality of rolls, said bearing cartridge supports being disposed on opposite sides of the frame and each comprising:
      (1) a vertical bearing support plate having lap tongues along its vertical edges and vertically spaced apart fastening means for securing said plate in the apparatus frame,
      (2) a bearing cartridge supported by said plate and including a horizontally extending hollow housing and a pair of spaced apart bearings within the housing, and
      (3) a short roll-supporting stub shaft journaled for rotation in said bearings and having one end of torque transmitting cross section for engagement by one end of a roll,
   (B) drive means on the opposite end of each of said stub shafts along one side of the apparatus,
   (C) power drive means,
   (D) a continuous drive transmission means in engagement with said power means and said shaft drive means, and
   (E) a closed case enclosing said drive means and drive transmission means, said bearing support plates comprising one wall of said case.

7. A roll apparatus according to claim 6 wherein:
   (A) said shaft drive means are sprockets,
   (B) said power drive means includes a driven sprocket, and
   (C) said power transmission means is a drive chain.

8. A roll apparatus according to claim 7 wherein:
   (A) the lower flight of said continuous drive chain engages the bottom periphery of each of said shaft drive sprockets,
   (B) a vertically adjustable longitudinally extending support bar underlies the lower flight of the drive chain to maintain the chain in engagement with the sprockets, and
   (C) a further longitudinally extending chain support bar underlies the upper flight of the drive chain spaced above the shaft drive sprockets.

9. A roll apparatus according to claim 6 wherein:
   (A) the opposite sides of the apparatus frame include a pair of longitudinally extending vertically spaced apart channel members having inwardly extending flanges, and
   (B) the vertically spaced apart fastening means of the bearing support plates engage said flanges.

10. A roll apparatus according to claim 6 wherein each of said stub shafts engages a recessed socket of corresponding torque transmitting cross section embedded in an elastomeric hub at the end of a roll.

11. A roll apparatus according to claim 6 wherein:
    (A) said frame is disposed at an inclined angle,
    (B) means are provided at the downstream end of said closed drive means case for introduction of oil thereto for maintenance of an oil bath therein,
    (C) further means are provided for draining of oil therefrom, and
    (D) the path of the drive transmission means extends through the oil bath.

12. A roll apparatus according to claim 6 wherein:
    (A) a longitudinally extending vertical abrasion-resistant skirt is supported from each side of the frame,
    (B) the surface of said skirt is closely spaced from the ends of the rolls, and
    (C) the bottom edge of said skirt is closely spaced from the tops of said stub shafts.

13. A roll apparatus according to claim 6 wherein:
    (A) said apparatus is a roll screen, and
    (B) a plurality of rolls are disposed within the frame in closely spaced apart sizing relation in a generally planar deck.

14. A roll apparatus according to claim 6 wherein the lap tongue along one vertical edge of the vertical support plate is a vertical seal plate removably secured to the support plate in face-to-face abutment and extending beyond the support plate along one edge.

* * * * *

UNITED STATES PATENT AND TRADEMARK OFFICE
CERTIFICATE OF CORRECTION

PATENT NO. : 4,311,242

DATED : January 19, 1982

INVENTOR(S) : Karl J. Hnatko

It is certified that error appears in the above-identified patent and that said Letters Patent are hereby corrected as shown below:

Column 5, line 16, "torgue" should be --torque--.

Signed and Sealed this

Twenty-eighth Day of December 1982

[SEAL]

Attest:

GERALD J. MOSSINGHOFF

Attesting Officer     Commissioner of Patents and Trademarks